No. 665,318. Patented Jan. 1, 1901.
F. W. GARRETT.
ELECTRIC MOTOR CONTROLLER.
(Application filed Aug. 24, 1899.)
(No Model.) 2 Sheets—Sheet 1.

WITNESSES:
S. E. Clarkeson.
B. M. Smith.

INVENTOR
Frank W. Garrett
BY
Geo. H. Parmelee
his ATTORNEY.

No. 665,318. Patented Jan. 1, 1901.
F. W. GARRETT.
ELECTRIC MOTOR CONTROLLER.
(Application filed Aug. 24, 1899.)
(No Model.) 2 Sheets—Sheet 2.
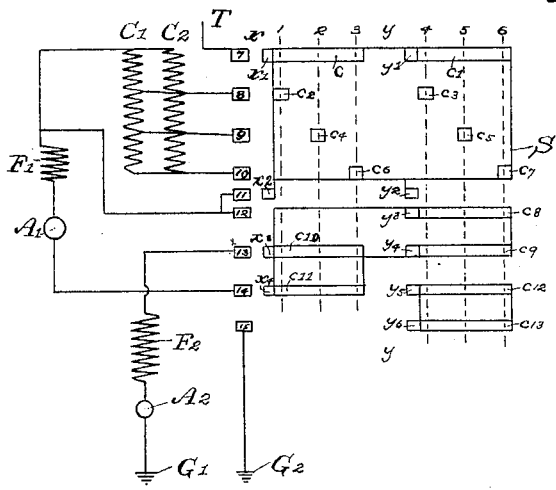
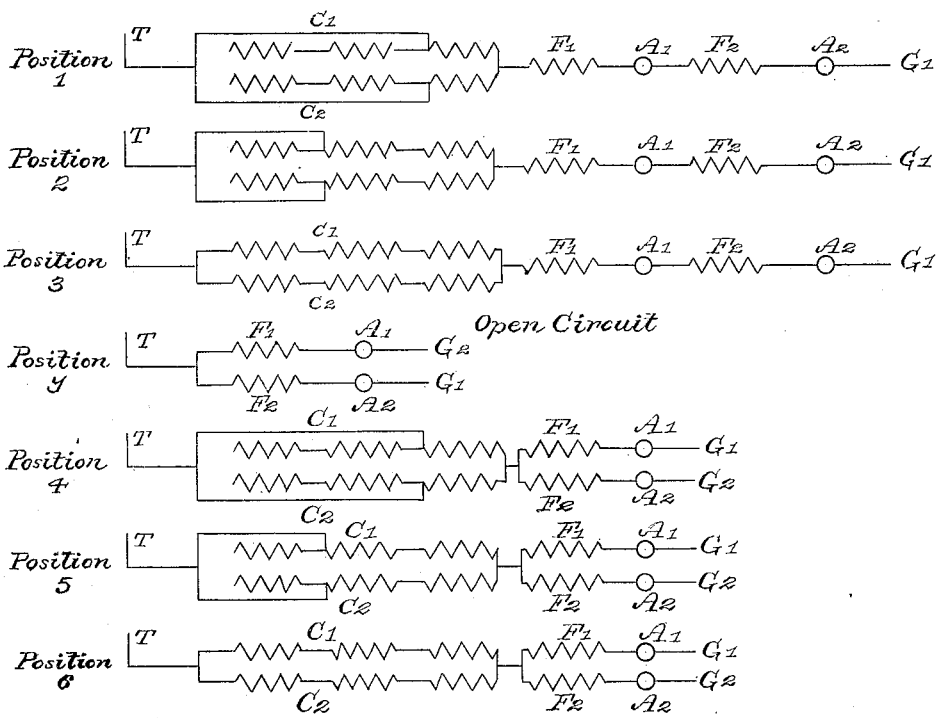
WITNESSES:
S. E. Clarkson
B. M. Smith
INVENTOR
Frank W. Garrett
BY
Geo. H. Parmelee
his ATTORNEY.

UNITED STATES PATENT OFFICE.

FRANK W. GARRETT, OF JOHNSTOWN, PENNSYLVANIA, ASSIGNOR TO THE LORAIN STEEL COMPANY, OF PENNSYLVANIA.

ELECTRIC-MOTOR CONTROLLER.

SPECIFICATION forming part of Letters Patent No. 665,318, dated January 1, 1901.

Application filed August 24, 1899. Serial No. 728,379. (No model.)

*To all whom it may concern:*

Be it known that I, FRANK W. GARRETT, of Johnstown, in the county of Cambria and State of Pennsylvania, have invented a new and useful Improvement in Controlling Electric Motors, of which the following is a full, clear, and exact description, reference being had to the accompanying drawings, which form a part of this specification.

This invention relates to the control of electric motors and of the mechanism or mechanisms driven thereby, and is designed to provide means for such control which is economical in point of current consumption, none of the current being wasted by the interposition of useless resistance, which permits the driven mechanism to be very gradually started and accelerated, which reduces to a very large extent the wear and tear of the driving-gears, the commutators, brushes, and bearings, and also obviates the danger of serious injury to or destruction of the motors, resulting from bursting of the armature-bands when running at high speeds on downgrades.

The invention consists in the combination, with one or more electric motors, of an electromagnetic clutch and a suitable switch whereby the operation of said clutch is controlled to effect a gradual driving connection between the armature-shaft or shafts and the driven mechanism.

It also consists in the combination, with a plurality of electric motors whose armature-shafts are normally disconnected from the mechanism to be driven, of a magnetic clutch for effecting a gradually-increased driving connection between the said shafts and mechanism, a switch for controlling the operation of said clutch, and also for varying the circuit relations of the motors, together with the necessary electrical connections.

The invention is applicable to stationary motors as well as to those employed in propelling moving vehicles, and the magnetic clutch embraced by the invention may be used to advantage in the control of various kinds of machinery.

Figure 2:
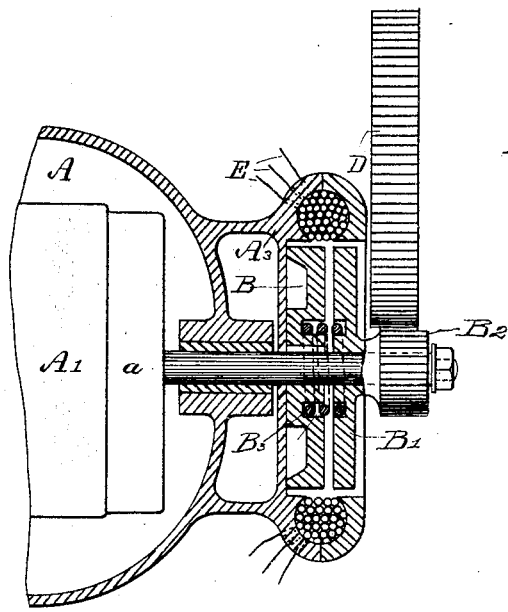
Figure 1:
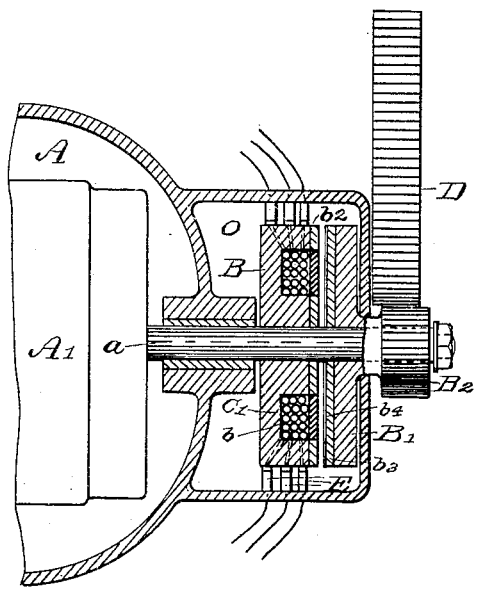

Referring to the accompanying drawings, Figure 1 is a view, partly in section and partly in plan, showing my improved clutch as applied to an electric motor. Fig. 2 is a similar view showing a modified form of clutch. Fig. 3 is a diagrammatic view illustrating the invention applied to the control of two electric motors and showing the clutch and circuit connections. Fig. 4 is a diagrammatic view showing the circuit relations in the several different positions of the switch.

The letter A, Fig. 1, designates a motor frame or casing, A' the armature, and $a$ the armature-shaft, turning in bearings in said frame or casing. B is a clutch-plate fast to said shaft and formed of magnetic material, either iron or steel. B' is a second plate of similar material loosely mounted on said shaft and carrying a pinion $B^2$ rigid therewith and meshing into a gear-wheel D, forming part of the driven mechanism.

Formed in the inner face of the plate B is an annular groove $b$, in which is seated a magnet-coil C', which is composed of a number of independent sections, any desired number of which may be connected in series through the medium of the switch hereinafter described. In the diagram Figs. 3 and 4 I have shown this magnet-coil as composed of three sections. E designates brushes which bear upon the rotary clutch-plate B and are electrically connected with contacts of the said switch. One pair of these brushes is provided for each section of the magnet-coil and each is electrically connected to its corresponding section, as indicated.

$b^2$ $b^3$ are renewable wear-plates of iron or steel detachably secured in any suitable manner to the inner faces of the respective clutch-plates. The use of these removable plates is advantageous from an economical standpoint; but they are in no way essential to the invention and may be omitted, as shown in Fig. 2.

In Fig. 1 I have shown an oil-box O, in which the clutch turns. The face of the plate $b^3$ is shown as having grooves or channels $b^4$ to carry the lubricant between the clutch-plates.

The operation of the clutch will be readily understood. The coil C' being energized magnetizes the clutch-plate B and causes the latter to attract the movable plate B' into contact therewith and effect a driving connection between the armature-shaft and the gear-wheel D. The degree of slippage between the two plates at any given current strength and load on the clutch depends upon the extent to which the coil C' is energized, being comparatively great when but a single section of said coil is in circuit and *nil* when all the coil-sections are energized.

In the modification shown in Fig. 2 instead of rotating the magnet-coil I inclose same in an extension $A^3$ of the motor frame or casing and surrounding the two clutch-plates, which are thus brought within the field of the coil and act as a core therefor. The tendency of the lines of force composing said field to shorten causes the clutch-plates to be attracted into contact with the fixed plate, and thus establish the driving connection between the armature-shaft and the gear-wheel D, as in the construction first described. $B^3$ designates springs interposed between the two clutch-plates and tending to separate the same.

Referring now to the diagram Fig. 3, the letters $A'$ $A^2$ designate the armatures of a pair of motors, $F'$ $F^2$ the field-coils thereof, and $C'$ $C^2$ the sectional magnet-coils connected in multiple arc with each other. T designates the connection with one side of the line, and $G'$ a ground connection through one of the armature-shafts. S is the controlling-switch, which is preferably of the well-known rotary type, having a plurality of contacts secured to the periphery of its drum. These contacts are shown as arranged in three groups, all the contacts of each particular group being connected electrically with each other, but disconnected electrically from the contacts of the other groups. In the first group are contacts $c$ to $c^7$, inclusive, in the second group $c^8$ to $c^{11}$, inclusive, and in the third group contacts $c^{12}$ and $c^{13}$. The contacts of the first group control the magnet-coil, those of the second group the series connection of the motors, and those of the third group the parallel connection thereof. In addition to the contacts above described I provide the controller-drum with a line of short contacts $x'$, $x^2$, $x^3$, and $x^4$ on the vertical line X, which are engaged, respectively, by the fingers 7, 11, 13, and 14 before reaching the first indicated or No. 1 position of the switch. Similar contacts $y'$ to $y^6$, inclusive, are provided on the vertical line Y for engagement with fingers 7, 11, 12, 13, 14, and 15 just before passing to indicated position No. 4. The position in which these contacts $y^1$ to $y^6$ are engaged, like the position in which contacts $x'$ to $x^4$ are engaged, is not indicated on the controller. The purpose of these two sets of contacts will hereinafter appear. Between the position No. 3 and the line of contacts $y'$ to $y^6$ is a point of open circuit. Finger No. 7 is connected to the trolley side of the circuit. Fingers 8, 9, and 10 connect the different sections of the two magnet-coils in parallel and the motor-circuit. Fingers 11 and 12 are connected to each other and to field-coils $F'$; finger 13 is connected to field-coil $F^2$ and through said coil and armature $A^2$ to ground; finger 14 is connected to armature $A'$, and finger 15 is connected to ground $G^2$. Upon the initial movement of the switch fingers 7, 11, 13, and 14 engage the contacts $x'$ $x^2$ $x^3$ $x^4$ and the path of the current is from trolley T to finger 7, contacts $x'$ $x^2$, finger 11, field $F'$, armature $A'$, finger 14, contacts $x^4$ $x^3$, finger 13, field $F^2$, and armature $A^2$ to ground $G'$. The magnet-coils are cut out, as will be seen, and the purpose of this position is simply to overcome the inertia of the armatures and start their rotation before actuating the clutches. The position is not indicated to the operator, for the reason that there should be nothing to induce him to stop on this position. Passing to position No. 1, the path of the current is from T to finger 7, contacts $c$ $c^2$, through one section of each magnet-coil in parallel, and then through the two motors in series, as before. In position No. 2 the only change made is that finger 8 loses engagement with contact $c^2$ and finger 9 engages contact $c^4$. This brings into circuit an additional section of each magnet-coil. In position No. 3 finger 9 has left the contact $c^4$ and finger 10 has engaged contact $c^6$. This puts the magnet-coils $C'$ $C^2$ entirely in circuit. Further movement of the switch opens the circuit through the magnet-coils and motors preparatory to passing to multiple. In passing to the first multiple position the fingers 7, 11, 12, 13, 14, and 15 first respectively engage the contacts $y'$ $y^2$ $y^3$ $y^4$ $y^5$ $y^6$ and the path of the current is from the trolley to finger 7, contacts $y'$ $y^2$, and fingers 11 and 12. Here the current divides, one part passing through field $F'$, armature $A'$, finger 14, contacts $y^5$ $y^6$, and finger 15 to ground, and the other part by contacts $y^3$ $y^4$, finger 13, field $F^2$, and armature $A^2$ to ground. This position is not indicated on the controller-index, as it is not desired to have the operator stop on this position. In positions 4, 5, and 6 contacts $c^3$, $c^5$, and $c^7$ operate successively to gradually connect in circuit the sections of the magnet-coils in precisely the same manner as the contacts $c^2$ $c^4$ $c^6$ in positions 1, 2, and 3, and it will not be necessary to again trace out the circuit in detail. The current after passing through the magnet-coils or sections thereof passes through the two motors in parallel by the path traced out in position, except that contacts $c^8$ $c^9$ $c^{12}$ $c^{13}$ take the place of the contacts on the line $y$. It will be seen, therefore, that I start the motors momentarily disconnected from the parts to be driven and gradually effect a connection with such parts by gradually increasing the action of the magnetic clutch, the magnet-coils building up in strength as the current passing therethrough increases and as more sections are connected in circuit. I then open the circuit and pass to multiple, repeating the operation of gradually strengthening the action of the clutch.

On downgrades the switch can be thrown to off-position, which not only opens the circuit through the motors, but also through the magnet-coils, and thereby releases the clutches. This permits the motors to remain idle and saves the wear of gears and at the commutators and bearings and also prevents accidents due to bursting of armature-bands.

It will be readily seen that the greater the load and the larger the current taken by the motors the stronger becomes the action of the clutch, its strength building up as the load increases; also, that when the clutch is free or slipping the counter electromotive force of the motors holds back the current, so that there is no useless waste of current.

The gradual manner in which the driving connection is made prevents lurching and jerking of the car-body in starting and reduces largely the strain and shock on the car body and truck.

It is obvious that various modifications may be made in the clutch and in the controlling-switch, and circuit connections may be made without departing from the spirit and scope of my invention, and I do not therefore wish to limit myself to the particular constructions and arrangement which I have herein shown and described.

The novel method of control herein described forms the subject-matter of a divisional application, Serial No. 10,152.

Having thus described my invention, what I claim, and desire to protect by Letters Patent, is—

1. The combination with an electric motor, and a device to be driven by said motor, of an electromagnetic clutch for effecting a driving connection between said motor and device, said clutch having a plurality of magnet-coils, and a switch arranged to successively connect said coils into or out of electrical circuit.

2. In an electrically-propelled vehicle, the combination with a plurality of electric motors, and electromagnetic clutches for effecting driving connections between said motors and the vehicle, of a switch arranged to start the motors with the coils of the clutch-magnets out of circuit and the clutches inactive, and by further movement to connect said coils in circuit, said switch also having contacts for controlling the circuit relations of the motors and thereby their power and speed.

3. The combination of a plurality of electric motors, electromagnetic clutches for effecting a driving connection between the said motors and the parts to be driven thereby, and a controlling-switch having contacts for coupling the motors either in series or in parallel, and other contacts for connecting in circuit more or less of the clutch magnet-coils.

4. The combination with a plurality of electric motors, and electromagnetic clutches for effecting a driving connection between the said motors and the parts to be driven thereby, said clutches having sectional magnet-coils, of a combined motor and clutch controlling switch having contacts for connecting the motors both in series and in parallel, and other contacts for connecting in circuit more or less of the said magnet-coils.

5. The combination with a plurality of electric motors and electromagnetic clutches for effecting a driving connection between the said motors and the parts to be driven thereby, of a switch having one set of contacts for connecting the motors in series, a second set of contacts for connecting the motors in multiple, and a third set of contacts for successively connecting into and removing from circuit the magnet-coils of the clutches.

6. The combination with a plurality of electric motors and electromagnetic clutches for effecting a driving connection between the said motors and the parts to be driven thereby, of a switch having one set of contacts for connecting the motors in series, a second set of contacts for connecting the motors in multiple, and a third set of contacts for connecting into circuit more or less of the magnet-coils of the clutches in both series and multiple relations of the motors.

7. The combination with a plurality of electric motors and electromagnetic clutches for effecting a driving connection between the said motors and the parts to be driven thereby, of a switch having one set of contacts for connecting the motors in series, a second set of contacts for connecting the motors in multiple, and a third set of contacts for connecting into circuit more or less of the magnet-coils of the clutches in both series and multiple relations of the motors and having also a point of open circuit intermediate the series and the parallel positions.

8. The combination with a plurality of electric motors and electromagnetic clutches for effecting a driving connection between the said motors and the parts to be driven thereby, of a switch having one set of contacts for connecting the motors in series, a second set of contacts for connecting the motors in multiple, and a third set of contacts for connecting into circuit more or less of the magnet-coils of the clutches, a portion of the contacts of the first and second sets being blind contacts arranged to effect the desired circuit connections of the motors before connecting into circuit any part of the said magnet-coils.

9. The combination with a plurality of electric motors, and electromagnetic clutches for connecting the same to the parts to be driven thereby, said clutches having sectional magnet-coils, of a controlling-switch having contacts and connections arranged to first connect the motors in series and then to successively connect in the magnet-coils, then to open the circuit through the motors and magnet-coils and connect the motors in parallel, and finally to again successively connect in circuit the magnet-coils.

10. The combination with an electric motor and an electromagnetic clutch for connecting the same to the motor-driving mechanism, said clutch having sectional magnet-coils, of a switch adapted to connect one or more of said coils in series with the motor-coils.

In testimony whereof I have affixed my signature in presence of two witnesses.

FRANK W. GARRETT.

Witnesses:
BLANCHE SMITH,
H. W. SMITH.